United States Patent
Oberlaender

(10) Patent No.: US 8,407,392 B2
(45) Date of Patent: Mar. 26, 2013

(54) FAST UNALIGNED CACHE ACCESS SYSTEM AND METHOD

(75) Inventor: Klaus J. Oberlaender, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/324,917

(22) Filed: Dec. 13, 2011

(65) Prior Publication Data

US 2012/0084512 A1 Apr. 5, 2012

Related U.S. Application Data

(63) Continuation of application No. 12/110,931, filed on Apr. 28, 2008, now Pat. No. 8,078,790, which is a continuation of application No. 10/777,710, filed on Feb. 11, 2004, now Pat. No. 7,366,819.

(51) Int. Cl.
*G06F 12/00* (2006.01)
*G06F 13/00* (2006.01)

(52) U.S. Cl. ............. 711/3; 711/100; 711/118; 711/154

(58) Field of Classification Search .............. 711/3, 5, 711/100, 117, 118, 128, 154, 201, 220
See application file for complete search history.

(56) References Cited

U.S. PATENT DOCUMENTS

| | | | |
|---|---|---|---|
| 4,908,789 | A | 3/1990 | Blokkum et al. |
| 5,511,029 | A | 4/1996 | Sawada et al. |
| 5,530,837 | A | 6/1996 | Williams et al. |
| 5,587,950 | A | 12/1996 | Sawada et al. |
| 5,703,828 | A | 12/1997 | Park et al. |
| 5,987,574 | A | 11/1999 | Paluch |
| 6,260,101 | B1 | 7/2001 | Hansen et al. |
| 6,405,286 | B2 | 6/2002 | Gupta et al. |
| 6,438,062 | B1 | 8/2002 | Curtis et al. |
| 6,449,209 | B1 | 9/2002 | Lee |
| 6,570,803 | B2 | 5/2003 | Kyung |
| 6,754,116 | B2 | 6/2004 | Janik et al. |
| 6,965,527 | B2 * | 11/2005 | Fasoli et al. ............... 365/189.15 |
| 6,981,122 | B2 * | 12/2005 | Volpe et al. .................... 711/202 |
| 7,081,897 | B2 * | 7/2006 | Garg .............................. 345/543 |
| 7,117,407 | B2 * | 10/2006 | Boldt ............................ 714/718 |
| 2001/0042174 | A1 | 11/2001 | Gupta et al. |
| 2002/0097629 | A1 | 7/2002 | Lee |

* cited by examiner

*Primary Examiner* — Tuan V. Thai
(74) *Attorney, Agent, or Firm* — Dickstein Shapiro LLP

(57) ABSTRACT

A cache unit multiple memory towers, which can be independently addressed. Cache lines are divided among multiple towers. Furthermore, physical lines of the memory towers are shared by multiple cache lines. Because each tower can be addressed independently and the cache lines are split among the towers, unaligned cache access can be performed. Furthermore, power can be conserved because not all the memory towers of the cache unit needs to be activated during some memory access operations.

14 Claims, 9 Drawing Sheets

FAST UNALIGNED CACHE ACCESS SYSTEM AND METHOD

CROSS-REFERENCE TO RELATED APPLICATION

This is a continuation of Ser. No. 12/110,931, filed Apr. 28, 2008, which issued as U.S. Pat. No. 8,078,790 on Dec. 13, 2011, which is a continuation of Ser. No. 10/777,710, filed Feb. 11, 2004, which issued as U.S. Pat. No. 7,366,819 on Apr. 29, 2008, both of which are hereby incorporated by reference.

FIELD OF THE INVENTION

The present invention relates to microprocessor systems, and more particularly to a memory access system for a microprocessor system to efficiently retrieve unaligned data.

BACKGROUND OF THE INVENTION

FIG. 1(a) is a simplified block diagram of a conventional microprocessor system 100a having a central processing unit (CPU) 110 coupled to a memory system 120. CPU includes an address generator 112, a data aligner 114 and various pipelines and execution units (not shown). Address generator 112 provides a memory address ADDR to memory system 120. Memory address ADDR is used to activate a row of memory system 120. In general a memory address includes a row portion that forms a row address for memory system 120. The remaining bits of the memory address designate a specific portion of the memory row. For clarity, the description herein assumes that the bottom row of memory system 120 has a row address of 0. Each successive row has a row address that is one more than the previous row. Furthermore, memory system 120 is described as being 64 bits wide and is conceptually divided into 4 16 bit half words. CPU 110 uses data aligner 114 to load data from or store data to memory system 120. Specifically, data aligner 114 couples a 64 bit internal data bus I_DB to memory system 120 using four 16 bit data buses DB0, DB1, DB2, and DB3. Conceptually internal data bus I_DB contains four 16 bit data half words that can be reordered through data aligner 114.

CPU 110 may access memory system 120 with multiple store and load instructions of different data width. For example, CPU 110 may support instructions that work with 8, 16, 32, 64, 128, 256 or 512 bit data widths. Furthermore, CPU 110 may support storing and loading of multiple data words simultaneously using a single access. For example, CPU 110 may write four 16 bit data words simultaneously as a single 64 bit memory access.

The ability to access data having different data widths may result in unaligned data. As illustrated in FIG. 1, memory system 120 contains data sets A, B, C, D, E, and F. Each data set is separated as one or more half words (i.e., 16 bits wide) in memory system 120. For example, data set A includes half words A0, A1, A2, and A3. Data set B includes half word B0. Data set C includes half words C0 and C1. Data set D includes half words D0, D1, D2, and D3. Data set E includes half word E0 and E1. Data set F includes half words F1, F2, F3, and F4 (not shown). Data set A, which is located completely in row 0, is aligned data and can easily be retrieved in one memory access. However, data set D is located in both row 1 and row 2. To retrieve data set D, CPU 110 must access memory system 120 twice. First to retrieve half word D0 in row 1 and then to retrieve half words D1, D2, and D3 in row 2.

Because memory bandwidth is one of the main factors limiting the performance of microprocessor system 100a, requiring multiple memory access to retrieve a single data set greatly decreases the performance of microprocessor system 100a. Replacing memory system 120 with a dual ported memory can eliminate the need for two memory accesses. However, dual ported memories greatly increases silicon cost (i.e. area) of the memory system as well as the power consumption of the memory system.

Furthermore as illustrated in FIG. 1(b) some microprocessor systems such as microprocessor system 100b includes a cache 130 to increase memory performance. As is well known in the art, caches are generally small fast memories, that store recently used data so that repeated access to the data can be performed very quickly. In general when data is read from, or written to the main memory (i.e. memory system 120) a copy is also saved in cache 130 along with the memory address of the data. Cache 130 monitors subsequent reads and writes and determines whether the requested data is already in cache 130. When the data is already in cache 130 (i.e. a cache hit) the data in cache 130 is used rather than memory system 120. Because data in cache 130 can be accessed faster than memory system 120 the performance of the overall system is improved. Furthermore, data is generally transferred between memory system 120 and cache 130 in a cache line, which is generally several times larger than a memory access of the CPU 110. Using large cache lines generally improves cache hit ratios because data that is in close proximity in memory are generally used together. Furthermore, large cache lines improve burst transfers on busses for write back and refilling. While caches that support aligned access are straight forward and well known in the art, caches supporting unaligned access have even larger problems than described above with respect to memory system 120, because the cache lines are larger and in general more lines are read at the same time.

Hence there is a need for a method or system that provides fast unaligned access to a memory system without requiring high power utilization or large silicon area.

SUMMARY

Accordingly, a microprocessor system in accordance with the present invention, uses a cache which includes multiple memory towers, each having multiple way sub-towers. A cache line is divided across all the memory towers. Within each memory tower the data segments of a cache line are stored in a single way sub-tower. However, each segment of the cache line is stored on a separate physical line within a set in the way tower. Specifically, a cache line includes a set of sequential data segments, each of the first M successive data segment is placed in a different memory towers. The (M+x)th data segment goes into the same memory tower as the xth data segment. Because the memory towers receive independent addresses, different physical lines of each memory tower can be accessed simultaneously to support unaligned data access in a single memory access.

In one embodiment of the present invention, a cache unit includes a first memory tower and a second memory tower. Each memory tower is includes a first way sub-tower and a second way sub-tower. A cache line of the cache unit would include a first set of data segments in the first way sub-tower of the first memory tower and a second set of data segments in the first way sub-tower of the second memory tower. Each data segment of the first cache line in a particular way sub-tower is located in a different physical line of the memory tower. Unaligned cache access is supported by activating the appropriate physical line of the different memory tower to provide the desired data segments. A data aligner is used to realign the data segments to the proper order.

The present invention will be more fully understood in view of the following description and drawings.

DETAILED DESCRIPTION

As explained above, conventional microprocessor systems do not provide adequate memory bandwidth for data sets stored in more than one row of a memory system. While using a dual port memory provides higher bandwidth, the cost in silicon area and power for the dual port memory prevents wide spread use of dual port memories. Furthermore, dual ported memory operate at lower frequencies than single ported memories. Co-pending U.S. patent application Ser. No. 10/777,570, entitled "FAST UNALIGNED MEMORY ACCESS SYSTEM AND METHOD", by Oberlaender, et al., herein incorporated by reference, describes a multi towered memory system that allows retrieval or storage of a data set on multiple rows of a memory system using a single memory access without the detriments associated with a dual port memory system. The present invention describes a novel cache structure that supports unaligned accesses for multi-towered memory systems.

Figure 1A:
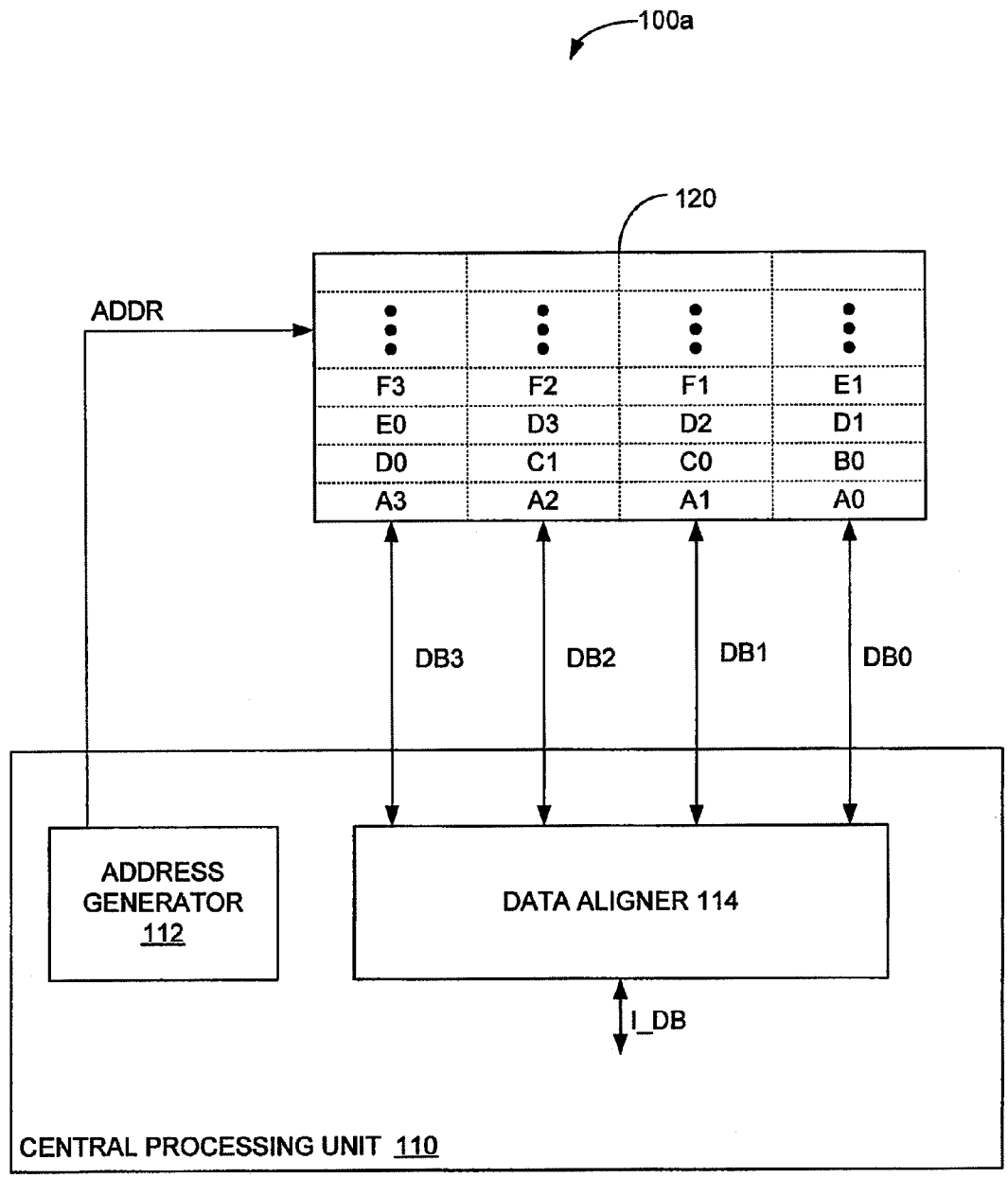
FIG. 1(a) is simplified block diagram of a conventional microprocessor system.
Figure 1B:
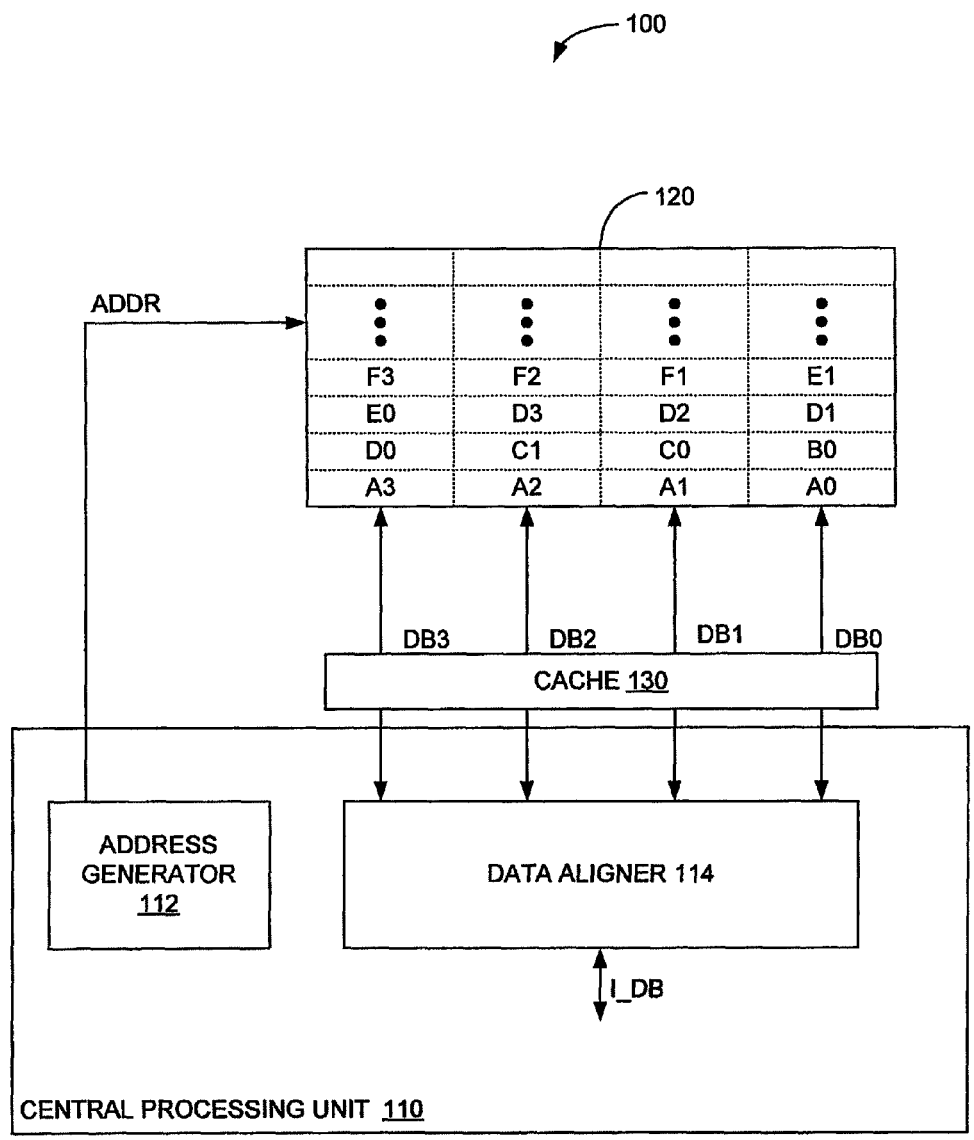
FIG. 1(b) is simplified block diagram of a conventional microprocessor system having a cache.
Figure 2:
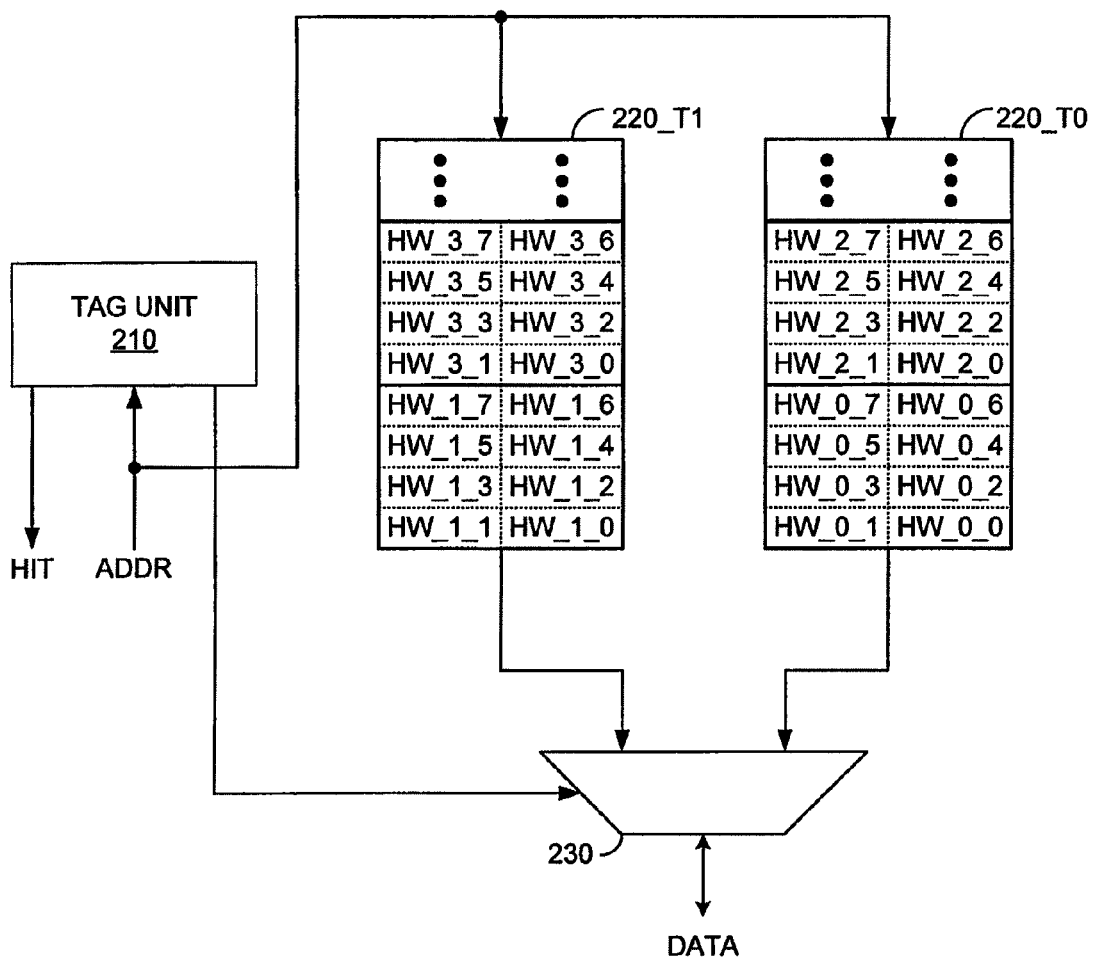
FIG. 2 is simplified block diagram of conventional cache unit.

FIG. 2 illustrates a conventional cache unit 200. Cache unit 200, includes a tag unit 210, a multiplexer 230 a first memory tower 220_T0 and a second memory tower 220_T1, For clarity most caches described herein are 2-way set associate caches. However, the principles of the present invention can be adapted by one skilled in the art for any arbitrary N-way associate cache. As is well known in the art, N-Way set associative caches divides cache into sets of N memory locations. Each memory location of main memory is mapped to one of the sets and could be located in any of the N location of the set in the cache. For clarity, each member of a set is called a "way" herein. For further clarity, unless otherwise stated, the caches described herein are for 32 bit (one whole word) systems and are described using 16 bit half words. Other embodiments of the present invention can use larger or smaller data words.

The memory locations in the memory towers are described by half word HW_X_Y, where X is the cache line of the half word and Y is the location of the half word within the cache line. Each cache line for the embodiment of FIG. 2 contains 8 half words. Thus for example, cache line 0 includes half words HW_0_0, HW_0_1, HW_0_2, HW_0_3, HW_0_4, HW_0_5, HW_0_6, and HW_0_7. Cache lines 0 and 1 form 1 set, cache lines 2 and 3 form a second set, and in general cache line X and X+1 form a set. Thus, as illustrated in FIG. 2, cache unit 200, stores cache line 0, cache line 2, and in general cache line X, where X mod 2 is equal to 0 in memory tower 220_T0. Thus, way 0 of each set is stored in memory tower 220_T0. Conversely, cache unit 200 stores cache line 1, cache line 3, and cache lines X, where X mod 2 equals 1 in memory tower 220_T1. Thus, way 1 of each set is stored in memory tower 220_T1.

As illustrated in FIG. 2 cache line 0 occupies four physical lines of memory tower 220_T0. In general only one physical line of memory tower 220_T0 may be active at a time. For aligned accesses, a half word HW_X_Y and a half word HW_X_Y+1 is read simultaneously, where Y MOD 2 is equal to 0. In general, half words HW_X+1_Y and HW_X+1_Y+1 would also be read at the same time because both ways are read simultaneously. Thus, the arrangement of half words in FIG. 2 with performs well for aligned accesses. Specifically, a CPU (not shown) access cache unit 200 by providing an address ADDR for the desired memory access to tag unit 210, memory tower 220_T0, and memory tower 220_T1. Tag unit 210 determines whether address ADDR is cached in cache unit 200. If address ADDR is in cache unit 200, tag unit 210 drives hit signal HIT to a HIT logic level (typically logic high) to indicate that address ADDR is in cache unit 200. Tag unit 210 also controls multiplexer to select either way 0 from memory tower 220_T0 or way 1 from memory tower 220_T1 to connect to data bus DATA.

The architecture of conventional caches such as cache unit 200 does not support unaligned access. For aligned access, a first half word HW_X_Y and a second half word HW_X_Y+1, where Y can be any number from 0 to 6 may be read. For example an unaligned access may read half word HW_0_1 and half word HW_0_2 simultaneously. However, half word HW_0_1 and half word HW_0_2 are on separate physical lines of memory tower 220_T0 and thus cannot be accessed simultaneously. Consequently, two memory accesses are necessary and memory performance is greatly degraded. Some conventional caches provide unaligned access by widening each memory tower so that each physical line of the memory tower has the same width as a cache line. Thus, all half words would be accessible simultaneously to allow unaligned access. However, the loading and propagation delay for the selection of the appropriate data is unsuitable for a timing critical system such as a cache unit. Furthermore, the silicon area and the number sense amps required to implement such a wide cache line would be cost prohibitive.

Figure 3:
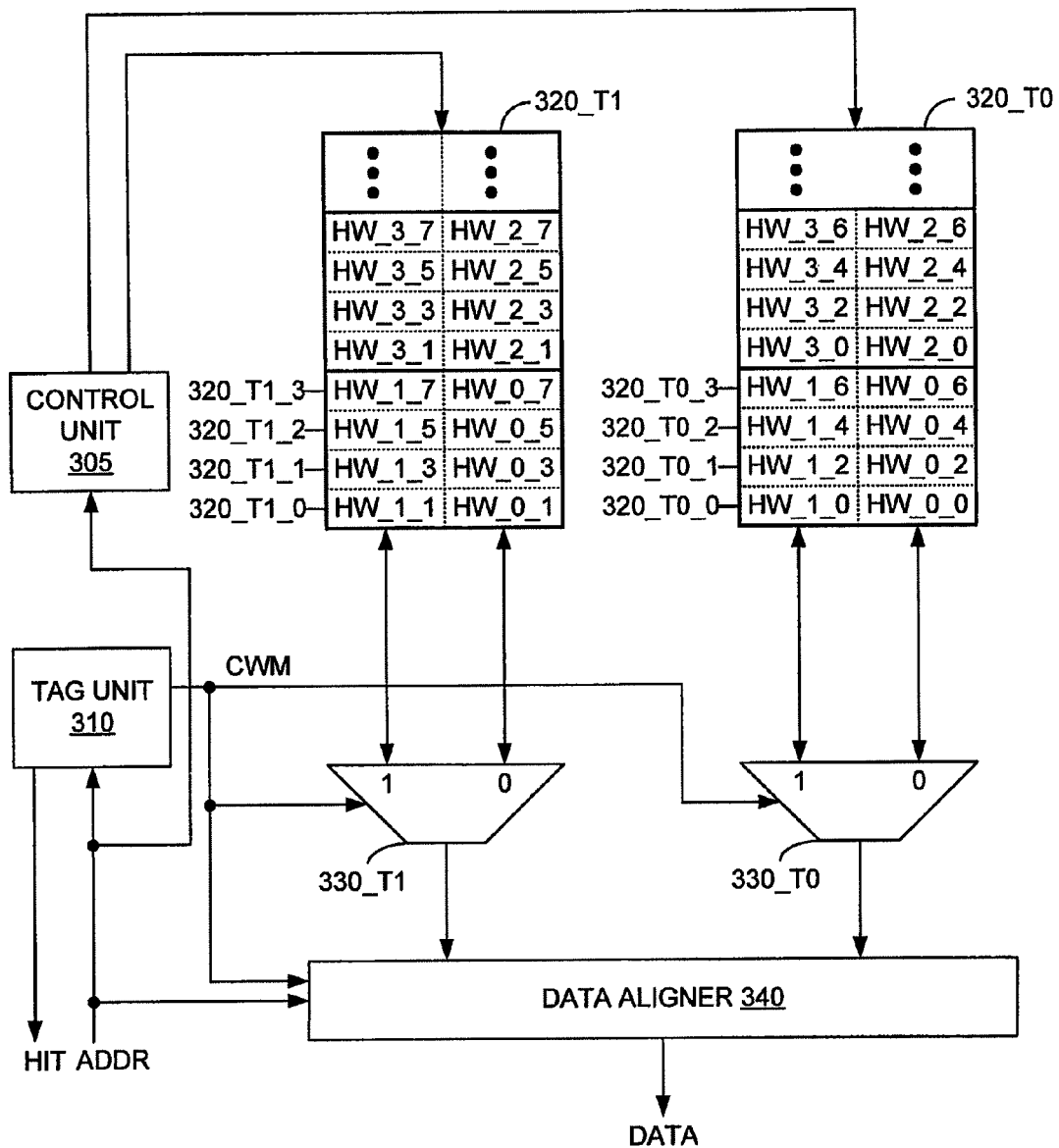
FIG. 3 is a block diagram of a novel cache unit in accordance with one embodiment of the present invention.

However, using the novel cache architecture of the present invention, unaligned access can be supported within a cache line with only minimal additional overhead. FIG. 3 is a block diagram of a cache unit 300 in accordance with one embodiment of the present invention. Cache unit 300 includes a control unit 305, a tag unit 310, a memory tower 320_T0, a memory tower 320_T1, way multiplexers 330_T1 and 330_T0, and a data aligner 340. In some embodiments of the present invention data aligner 340 is part of the central processing unit rather than cache unit 300. Each cache line for the embodiment of FIG. 3 contains 8 half words. Thus for example, cache line 0 includes half words HW_0_0, HW_0_1, HW_0_2, HW_0_3, HW_0_4, HW_0_5, HW_0_6, and HW_0_7.

Unlike conventional cache units, cache unit 300 stores multiple ways of different cache lines in the same memory tower. Furthermore, a single cache line is divided across multiple towers in even and odd half words. In addition, physical lines of the memory towers are shared by multiple cache lines. For clarity, the first four physical lines of memory tower 320_T0 are referenced as physical lines 320_T0_0, 320_T0_1, 320_T0_2, and 320_T0_3. These four physical lines correspond to one logical cache line and one tag entry. Similarly, the first four physical lines of memory tower 320_T1 are referenced as physical lines 320_T1_0, 320_T1_1, 320_T1_2, and 320_T1_3.

Cache line 0 is stored in both memory tower 320_T0 and 320_T1. Specifically, half words HW_0_0, HW_0_2, HW_0_4, and HW_0_6 are stored on physical lines 320_T0_0, 320_T0_1, 320_T0_2, and 320_T0_3, respectively. Conversely half words HW_0_1, HW_0_3, HW_0_5, and HW_0_7 are stored in physical lines 320_T1_0, 320_T1_1, 320_T1_2, and 320_T1_3. Cache line 0 shares the physical lines of memory tower 320_T1 and 320_T0 with cache line 1. Specifically, half word HW_1_Y shares a physical line with half word HW_0_Y, where Y is an integer from 0 to 7, inclusive. Note that half words where Y is even are all located in memory tower 320_T0 and half words where Y is odd are all located in memory tower 320_T1.

Memory towers 320_T1 and 320_T2 are controlled independently by control unit 305. Thus, a different physical lines of memory tower 320_T1 and memory tower 320_T2 may be active at the same time. The arrangement of the half-words described above combined with the ability to access the memory towers independently allows unaligned access within a cache line. For example to handle a cache access requesting half words HW_0_1 and HW_0_2, control unit 305 simultaneously activates physical line 320_T1_0 of memory tower 320_T1 and physical line 320_T0_1 of memory tower 320_T0. Way multiplexers 330_T1 and 330_T0 are configured to pass half word HW_0_1 and half word HW_0_2, respectively, to data aligner 340. Data aligner would realign half word HW_0_1 and half word HW_0_2 to the appropriate order and provide the data on data bus DATA. Another benefit of this arrangement is reduced power consumption for memory accesses that use a single half word. Specifically, since multiple ways of different cache lines are in the same memory tower, only that memory tower needs to be activated on a half-word access.

In actual operation, a CPU (not shown) makes a memory request with an address ADDR. Control unit 305 activates the appropriate physical lines of memory tower 320_T1 and memory tower 320_T0. The higher order bits of address ADDR determine which logical cache line is used and the lower order bits determine which physical lines are activated. Specifically, the lowest 3 bits would indicate which half word begins the addressed data. Table 1 shows which physical lines within a set would be addressed based on the lower three bits of the address.

TABLE 1

| Lower 3 Address Bits | Tower 320 T1 | Tower 320 T-0 |
|---|---|---|
| b'000 | 0 | 0 |
| b'001 | 0 | 1 |
| b'010 | 1 | 1 |
| b'011 | 1 | 2 |
| b'100 | 2 | 2 |
| b'101 | 2 | 3 |
| b'110 | 3 | 3 |
| b'111 | 3 | 0 |

Tag unit 310 determines whether the requested address is located within cache unit 300. If address ADDR is located in cache unit 310, tag unit 310 drives cache hit signal HIT to an active logic level (generally logic high) and controls way multiplexers 330_T1 and 330_T0. Data aligner 340 is configured by the low order bits of address ADDR to determine how the data from the way multiplexers should be realigned.

Figure 4:
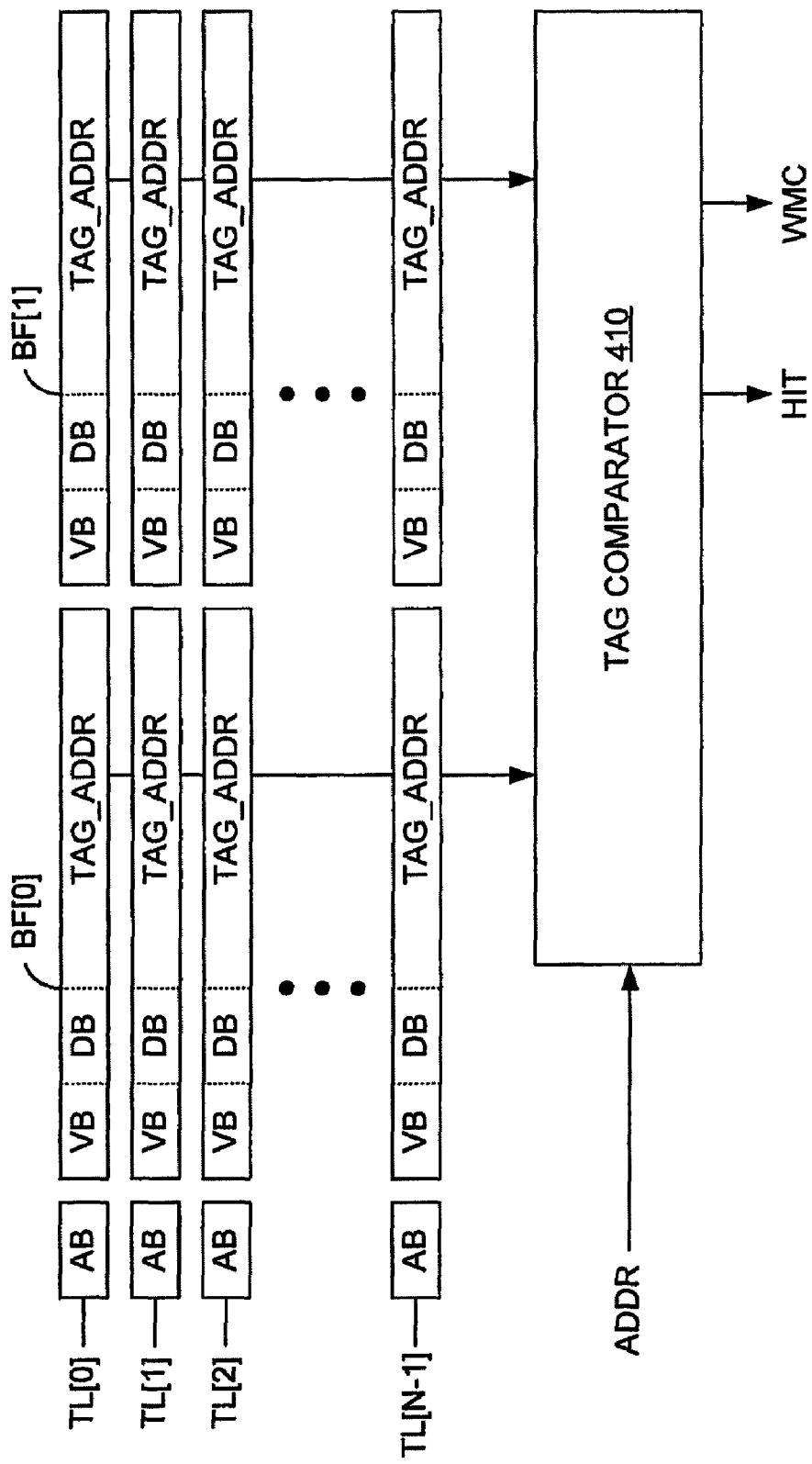
FIG. 4 is a block diagram of a novel tag unit in accordance with one embodiment of the present invention.

FIG. 4 is a block diagram of tag unit 310. Tag unit 310 includes N tag lines TL[0] to TL[N−1] and a tag comparator 410. Each tag line includes an age bit AB, a first bit field BF[0], and a second bit field BF[1]. Each bit field includes a valid bit VB, a dirty bit DB, and a tag address T_ADDR. Valid bit VB indicates whether the data in the corresponding cache memory location is valid. Dirty bit DB indicates whether the data in corresponding cache memory location is newer than the corresponding memory location in the main memory. Other embodiments of the present invention include additional status and control bits. For example in one embodiment of the present invention, a lock bit can be set to insure that the corresponding entry remains in the cache. If the tag line is used for a different memory location, the current data must be written to main memory if the dirty bit is set to maintain cache coherence. Age bit AB indicates whether bit field BF[0] or bit field BF[1] contains older data. When a tag line must be reused and both bit field BF[0] and bit field BF[1] correspond to valid data (as indicated by the valid bit), the bit field that is older is reused. Other embodiments of the present invention may use other methods for determining which lines are reused. Tag comparator 410 compares a portion of incoming address ADDR with the tag addresses TAG_ADDR of the set of cache lines corresponding to address ADDR to determine whether a cache hit occurs. Other embodiments of the present invention may use other methods to determine cache hits. When a Cache hit occurs tag comparator 410 drives hit signal HIT to a hit logic level (i.e. logic high) otherwise tag comparator 410 drives hit signal HIT to a miss logic level (i.e. logic low). Furthermore, when a cache hit occurs, tag comparator 410 drives cache way multiplexer control signal CWM to control way multiplexers 330T1 and 330_T0 to provide the appropriate data to data aligner 340. Specifically, for the embodiment in FIG. 2, when way 1 is needed, tag unit 310 drives cache way multiplexer control signal CWM to logic high, and when way 0 is needed tag unit 310 drives cache way multiplexer control signal CWM to logic low.

Figure 5:
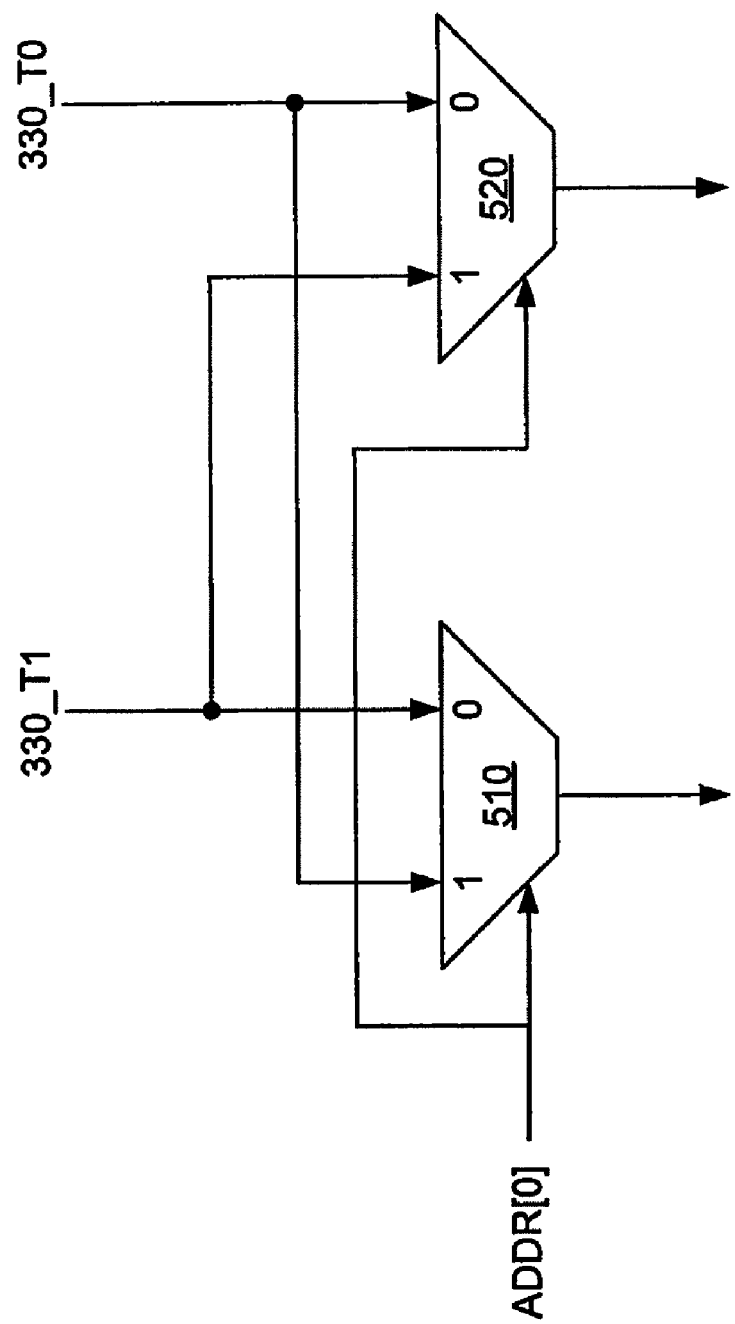
FIG. 5 is a block diagram of a data aligner in accordance with one embodiment of the present invention.

FIG. 5 is a block diagram of an embodiment of data aligner 340. Data aligner 340 includes a multiplexer 510 and a multiplexer 520. The output data from way multiplexer 310_T1 are applied to the logic high input port of multiplexer 520 and the logic low input port of multiplexer 510. The output data from way multiplexer 310_T0 are applied to the logic high input port of multiplexer 510 and the logic low input port of multiplexer 520. Address bit ADDR[0] controls multiplexer 510 and 520. Thus for example, if the CPU wishes to read an unaligned data word of half words HW_1_3 and HW_1_4, control unit 305 causes memory tower 320_T1 to output the contents of physical line 320_T1_1 and causes memory tower 320_T0 to output physical line 320_T0_2. Cache way multiplexer control signal CWM would be at logic high because way 1 is being selected. Thus, data aligner 30 receives half word HW_1_3 from way multiplexer 330_T1 and half word HW_1_4 from way multiplexer 330_T0 The data aligner would realign the data so multiplexer 510 outputs half word HW_1_4 and multiplexer 520 outputs half word HW_1_3.

Figure 6A:
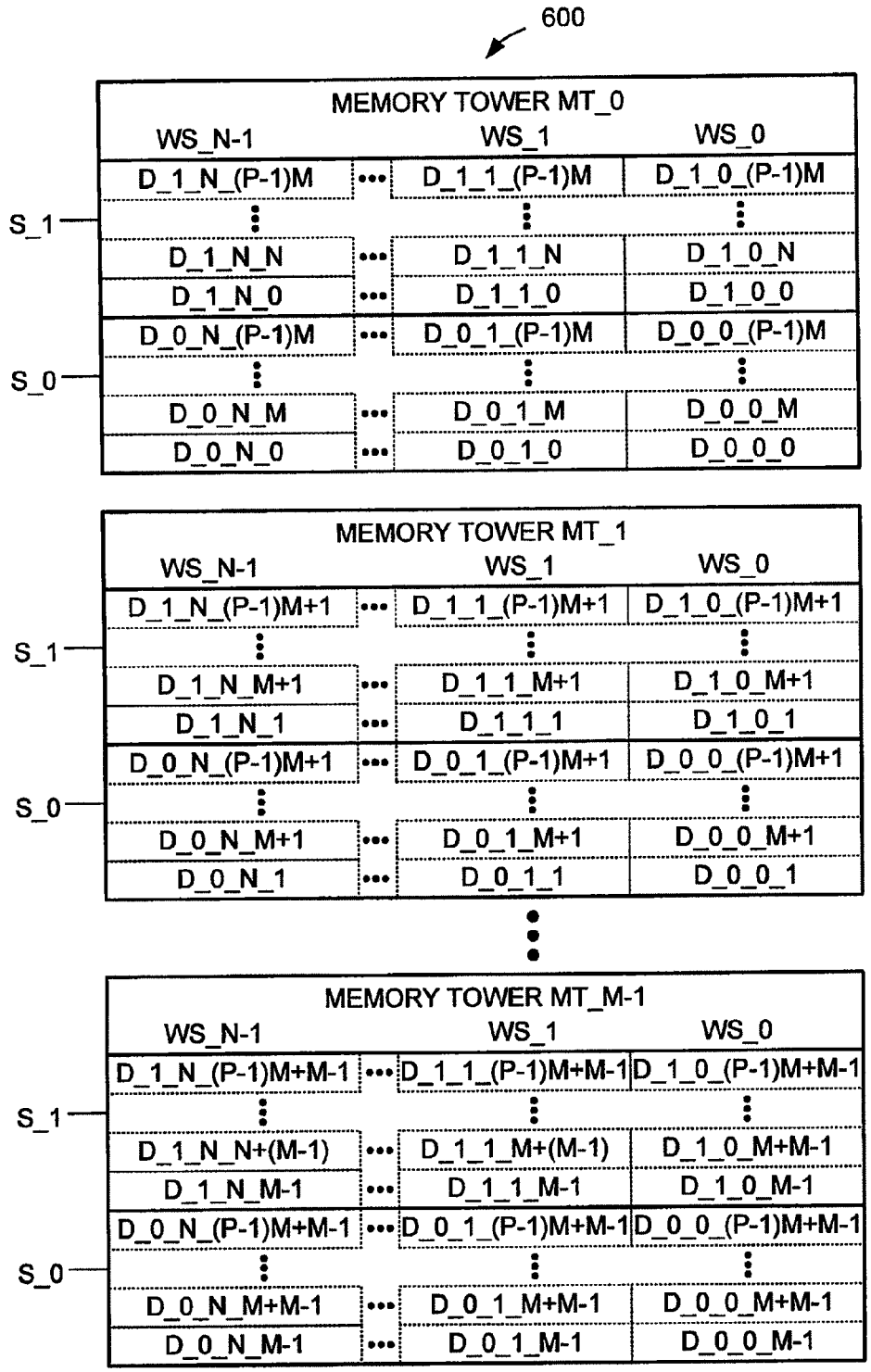
FIG. 6(a)-(d) illustrate the memory towers of cache unit in accordance with one embodiment of the present invention.
Figure 6B:
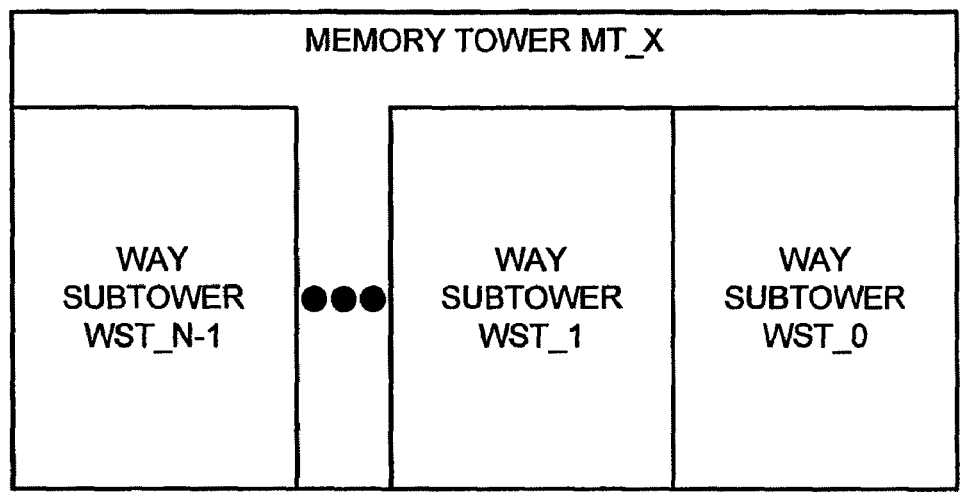
Figure 6C:
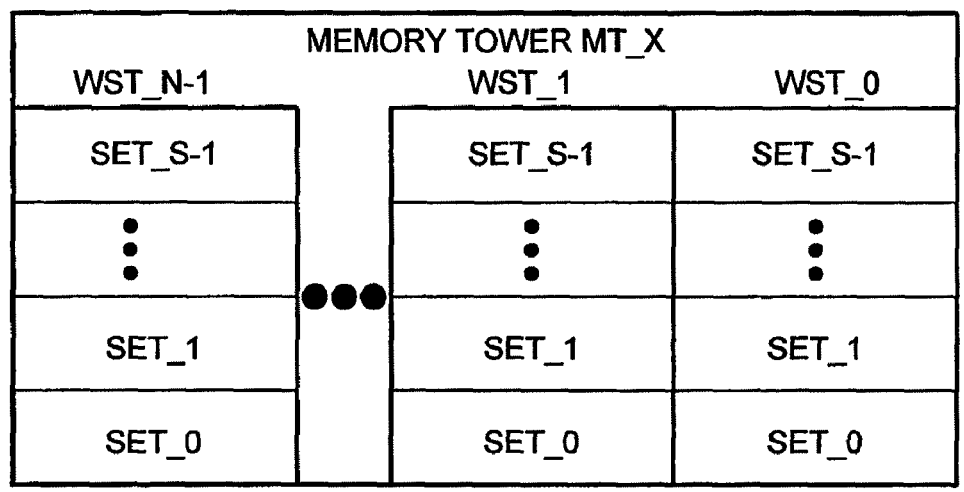
Figure 6D:
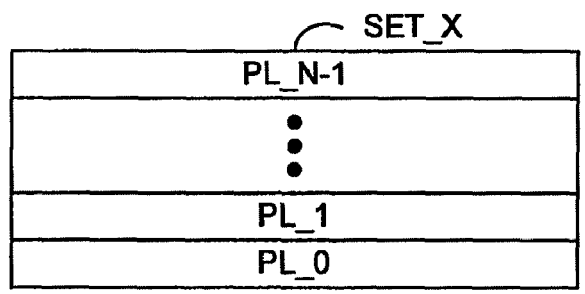

FIG. 6(a) illustrates the M memory towers of a N-way set associative cache 600 for a system supporting unaligned access at M data segment. For example, M would be 4 for a 64 bit system supporting unaligned access on 16 bit boundaries. As illustrated in FIG. 6(b), a memory tower MT_X is divided into N way sub-towers (WST_0, WST_1, . . . WST_N−1). Furthermore, as illustrated in FIG. 6(c) each memory sub-tower is further divided into S sets (SET_0, SET_1, . . . SET S−1). As illustrated in FIG. 6(d), a set SET_X includes P physical memory lines PL_0, PL_1, ... PL_P. Although FIG. 6(d) only shows one set, the physical line extends through all the way sub-towers. For generality, instead of half words, FIG. 6 uses the notation data segment D_X_Y_Z, where X is the set number, Y is the way number, and Z is the data segment number. A cache line is divided across all the memory towers. Within each memory tower the data segments of a cache line are stored in a single way tower. However, each segment of the cache line is stored on a separate physical line within a set in the way tower. Specifically, a cache line includes a set of sequential data segments, each of the first M successive data segment is placed in a different memory towers. The (M+x)th data segment goes into the same memory tower as the xth data segment.

Figure 7:
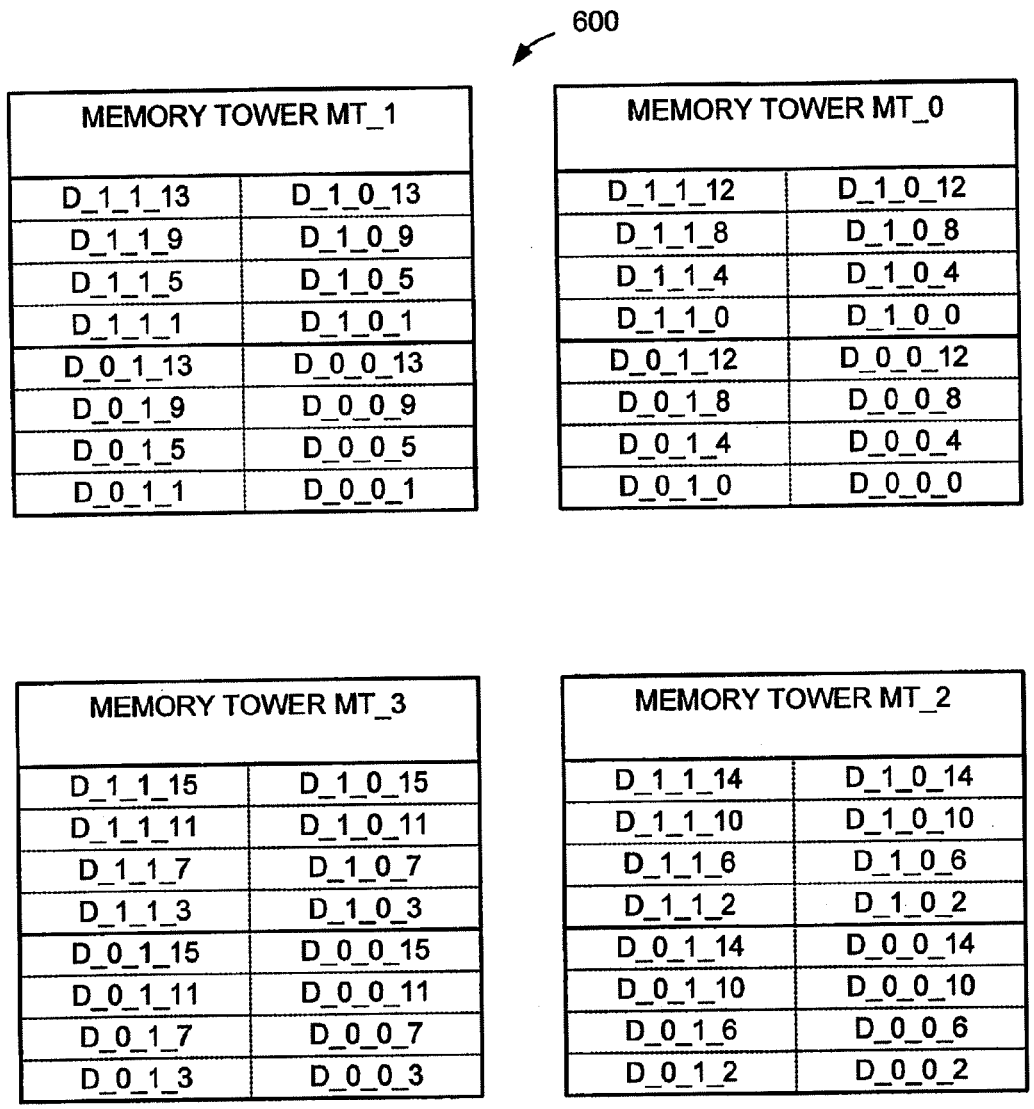
FIG. 7 illustrates the arrangement of data segments in the memory towers of a cache unit in accordance with one embodiment of the present invention.

Specifically, a cache line would have the data segments D_X_Y_0 to D_X_Y_(P−1)*M+M−1. Physical line PL of set X of way sub-tower Y, of memory tower MT would contain data segment D_X_Y_Z where Z is calculated as PL*M+MT. Thus, for example in a 2 way set associative cache having a 64-bit wide interface and with access being alignable at each half-word (thus each tower is 16 bits wide) and having four physical lines per cache line, N is equal to 2, P is equal to 4 and M is equal to 4. Thus, a cache line from set X and way Y would contain data segments (D_X_Y_0, D_X_Y_1, D_X_Y_2, ... D_X_Y_14, D_X_Y_15. FIG. 7 illustrates how the cache lines from sets 0 and 1 and ways 0 to 4 would be arranged in the 4 memory towers. As explained above, data segment D_X_Y_PL*M+MT, is on physical line PL, of set X, in way sub-tower Y, of memory tower MT.

In the various embodiments of this invention, novel structures and methods have been described to provide unaligned access to a cache. By using a multi-towered caches having independent addressing and splitting the cache lines across multiple towers and combining corresponding data segments from different ways into one tower, the CPU of a microprocessor systems in accordance with the present invention can access the cache in an unaligned manner, while using a minimal interface size equal to the access width multiplied by the number of ways. The smaller interface size reduces overhead as compared to conventional caches that require an interface size equal to the size of the cache line. Furthermore, power consumption can be reduced on partial accesses and overhead is reduced for accessing all ways of the full logical bandwidth. The various embodiments of the structures and methods of this invention that are described above are illustrative only of the principles of this invention and are not intended to limit the scope of the invention to the particular embodiments described. For example, in view of this disclosure, those skilled in the art can define other memory systems, memory towers, tag units, way sub-towers, sets, multiplexers, data aligners, and so forth, and use these alternative features to create a method or system according to the principles of this invention. Thus, the invention is limited only by the following claims.

What is claimed is:

1. A cache unit comprising:
   a first memory tower, having a first way sub-tower and a second way sub-tower;
   a second memory tower, having a first way sub-tower and a second way sub-tower,
   wherein a first cache line of the cache unit includes a first plurality of data segments in the first way sub-tower of the first memory tower and a second plurality of data segments in the first way sub-tower of the second memory tower;
   a first way multiplexer having a first input port coupled to the first way sub-tower of the first memory tower, a second input port coupled to the first way sub-tower of the first memory port, and an output port;
   a second way multiplexer having a first input port coupled to the first way sub-tower of the second memory tower, a second input port coupled to the first way sub-tower of the second memory port, and an output port; and
   a data aligner coupled to the output port of the first way multiplexer and the output port of the second way multiplexer, wherein the data aligner comprises a first data aligner multiplexer and a second data aligner multiplexer, and output data from second way multiplexer are applied to the logic high input port of the second data aligner multiplexer and the logic low input port of the first data aligner multiplexer, and output data from first way multiplexer are applied to the logic high input port of first data aligner multiplexer and the logic low input port of second data aligner multiplexer.

2. The cache unit of claim 1, wherein
   the first cache line comprises sequential data segments;
   the first plurality of data segments includes a first data segment and a third data segment; and
   the second plurality of data segments includes a second data segment and a fourth data segment.

3. The cache unit of claim 1, wherein in a second cache line of the cache unit includes a first plurality of data segments in the second way sub-tower of the first memory tower and a second plurality of data segments in the second way sub-tower of the second memory tower.

4. The cache unit of claim 3, wherein a physical line of the first memory tower includes data segments from the first cache line and the second cache line.

5. The cache unit of claim 1, further comprising a tag unit coupled to control the first way multiplexer and the second way multiplexer.

6. The cache unit of claim 5, wherein the tag unit is configured to determine whether a memory address is cached by the cache unit.

7. The cache unit of claim 1, wherein the first memory tower further comprises a third way sub-tower and a fourth way sub-tower.

8. The cache unit of claim 1, further comprising a third memory tower and a fourth memory tower.

9. The cache unit of claim 8, wherein the first cache line includes a third plurality of data segments in the third memory tower and a fourth plurality of data segments in the fourth memory tower.

10. A method of operating a cache unit having a first memory tower and a second memory tower, the method comprising:
    storing a first plurality of data segments of a first cache line in a first way sub-tower of the first memory tower;
    storing a second plurality of data segments of the first cache line in a first way sub-tower of the second memory tower;
    storing a first plurality of data segments of a second cache line in a second way sub-tower of the first memory tower;
    storing a second plurality of data segments of the second cache line in a second way sub-tower of the second memory tower;
    activating a first physical line of the first memory tower, wherein the first physical line includes data segments from the first cache line and the second cache line;
    activating a second physical line of the second memory tower, wherein the second physical line of the second memory tower includes data segments from the first cache line and the second cache line, wherein the first physical line of the first memory tower has a different address than the second physical line of the second memory tower; and aligning at least one of the data segments from the first memory tower with at least one of the data segments from the second memory tower.

11. The method of claim 10, wherein a first data segment of the first cache line is in the first way sub-tower of the first memory tower and a second data segment of the first cache line is in the first way sub-tower of the second memory tower and wherein the second data segment is adjacent the first data segment.

12. The method of claim 10, wherein the first data segment is in the first physical line of the first memory tower and the second data segment is in the second physical line of the second memory tower.

13. The method of claim 12, further comprising realigning the first data segment and the second data segment.

14. A cache unit having a first memory tower and a second memory tower, comprising:

means for storing a first plurality of data segments of a first cache line in a first way sub-tower of the first memory tower;

means for storing a second plurality of data segments of the first cache line in a first way sub-tower of the second memory tower;

means for storing a first plurality of data segments of a second cache line in a second way sub-tower of the first memory tower; and means for storing a second plurality of data segments of the second cache line in a second way sub-tower of the second memory tower means for activating a first physical line of first memory tower, wherein the first physical line includes data segments from the first cache line and the second cache line;

means for activating a second physical line of the second memory tower, wherein the second physical line of the second memory tower includes data segments from the first cache line and the second cache line, wherein the first physical line of the first memory tower has a different address than the second physical line of the second memory tower; and means for aligning at least one of the data segments from the first memory tower with at least one of the data segments from the second memory tower.

* * * * *